UNITED STATES PATENT OFFICE.

JULIUS J. MILLER, OF ST. JOSEPH, MICHIGAN, ASSIGNOR, BY MESNE ASSIGNMENTS, TO WIREBOUNDS PATENTS COMPANY, OF KITTERY, MAINE, A CORPORATION OF MAINE.

WIRE-BOUND-BOX-BLANK MACHINE.

1,248,418.  Specification of Letters Patent.  Patented Nov. 27, 1917.

Application filed October 2, 1911. Serial No. 652,232.

*To all whom it may concern:*

Be it known that I, JULIUS J. MILLER, a citizen of the United States of America, and resident of St. Joseph, Berrien county, Michigan, have invented a certain new and useful Improvement in Wire-Bound-Box-Blank Machines, of which the following is a specification.

My invention relates to machinery for use in making wire bound boxes or crates of the kind in which the blanks for the sides are reinforced by means of cleats and binding wires, the cleats being secured upon the inner surface of the blank along the edges thereof, and the wires being secured upon the outer surface of the blank by staples which penetrate the sheets of veneer to also secure the cleats in place, whereby the blank may be folded about the rectangular end walls of the box or crate, and secured thereto by means of staples or nails inserted through the end walls and cleats, it being customary to leave one section of the blank unfastened and adapted for use as a swinging cover.

Generally stated, the object of my invention is to provide an improved and highly efficient machine for making box blanks of this general character.

Special objects are to provide an improved and highly efficient mechanism for spacing the cleats apart endwise; to provide improved and highly efficient spacing mechanism which will serve also to keep the cleats along one edge of the blank in line with or directly opposite the cleats on the other edge thereof; to provide an improved construction and arrangement whereby only two spacing blocks are necessary for the entire machine; and to provide an improved construction and arrangement whereby a larger space of any desired width is produced between the ends of the blank in an easy and convenient manner.

It is also an object to provide certain details and features of improvement and combinations tending to increase the general efficiency of a box blank machine of this particular character.

To the foregoing and other useful ends, my invention consists in matters hereinafter set forth and claimed.

In the accompanying drawings—

As thus illustrated, and referring more particularly to Figs. 1, 2, 3 and 4, it will be seen that my invention comprises a base A upon which two upright side frames or castings B are mounted at one end, and upon which two similar uprights or castings C are mounted at the other end. The side frames B are connected as usual by a hollow cross bar $b$, and by an upper flat bar $b'$, the latter carrying the usual stapling heads D, these staplers being of any suitable, known or approved form. The upright frames or castings C are connected by a shaft $c$ upon which are mounted the belt pulleys $c'$ that support the fast running feed belts E, these belts being also supported by the pulleys $e$ on the shaft $e'$, which latter is supported in suitable bearings on the main frames or uprights. The frames B and C are connected by horizontal and longitudinally extending guides F, each guide consisting of two flat bars arranged parallel with space between their opposing surfaces, the bottom of the space in each case being formed by one of the belts E, whereby parallel guides are provided for the cleats of the blank, the belts supporting the cleats and moving them forward by friction. These belts are driven in any suitable or desired manner. If necessary, belt tighteners $e^2$ can be employed for keeping the belts stretched tight and level in the guides.

As stated, the said staplers D are of any suitable, known or approved form, and are operated by the usual reciprocating bar or cross head $d$, which latter is operated by the usual pitmen $d'$ connected at their lower ends with eccentrics $d^2$ mounted on the shaft G, which latter is driven and controlled in any suitable or desired manner. The said staplers have wire feeding devices $d^3$ of any suitable, known or approved character, for feeding the wire from which the staples are made, and each wire feeding device is operated by a vertical reciprocating dog or pawl $d^4$ carried by the vertically reciprocating cross head $d$, whereby the wire is fed into the staplers each time the cross head starts to move downward. The rock shaft H extends horizontally across the machine from one side frame to the other, at a point just above the wire feeding devices, and is provided with fingers $h$ which engage the wire feed pawls $d^4$ when it is desired to discontinue the feeding of the wire. For this purpose, said rock shaft is provided with a crank arm $h'$ which is connected by a vertical rod $h^2$ with the pivoted foot treadle $h^3$ at the base of the machine. When the operator places his foot on the said treadle, the rod $h^2$ moves upward, and thereby rocks the shaft H and causes the finger $h$ to throw the pawls $d^4$ out of engagement with the ratchet wheels of the wire feeding devices. This permits the blanks to continue moving along through the machine, but without driving any of the staples, whereby spaces of any desired breadth or extent are produced between the ends of the blank, as will hereinafter more fully appear.

The means for feeding the blanks step by step below the staplers consists of a pair of parallel members I, one at each side of the machine, said members being arranged to engage the blanks after the latter have passed out from below the staplers, whereby the blanks are pulled through the machine. Each member I consists preferably of a sprocket chain arranged to travel on sprockets mounted on horizontal shafts $i$, these shafts being adjustably held in place vertically by means of adjustable set screws $i'$, which set screws are disposed above the end bearings of the said shaft. These bearings may consist of slots $i^2$ formed in horizontal and longitudinally extending arms $i^3$ projecting from the side frames B, whereby the said sprocket chains are supported in proper position above the path of travel of the blanks. It will be seen that each sprocket chain I is disposed directly above the path of travel of the cleats of the blanks, and that each chain is provided with teeth or projections which impinge upon the upper surface of the blanks to move them forward step by step while being stapled. For this purpose the said sprocket chains are preferably operated by a ratchet feed mechanism J suitably connected and operated by the shaft G, in the usual and well known manner. It will be understood that this step by step feeding mechanism is so constructed and timed that the blank is stationary while two staples are driven crosswise of the binding wires and through the veneer into the cleats. As soon as the stapling heads start upward, however, the ratchet feed mechanism then causes the blank to move along one step and come to a stand still, and then the stapler heads move down again to drive another pair of staples, one staple for each binding wire.

The binding wires are supplied in any suitable, known or approved manner from reels K mounted on the top of the frame, these wires being brought down and guided below the staplers by means of rolls $k$, or other suitable, known or approved devices. As explained, these wires are secured along the edges of the blanks by the staples which are driven crosswise thereof, each staple extending downward through the veneer of the blank and into a cleat thereof, whereby the four rectangular sections of the blanks are flexibly connected together by the binding wires secured to the outer surface thereof, with the adjacent portions of said sections properly spaced apart to insure the desired result when the blank is folded around the end walls of the box or crate.

To support the finished blank, suitable guides L are provided below the sprocket chain feeding mechanism, each guide being practically a continuation of one of the guides F at the other end of the machine. These guides L receive the cleats of the blanks and provide parallel ways along which the cleats may slide while held end to end in two parallel longitudinally moving rows or series.

To obtain the desired result, the belts E are preferably so operated that they move much faster than the sprocket chains I, whereby these belts E move faster than the cleats resting thereon, except when there is space ahead which enables the cleats to move quickly forward to catch up with those ahead. But when the unattached cleats are being held back by the step by step and comparatively slow feeding motion of the sprocket chains I, then the belts E move forward in sliding contact with the lower edges of the cleats resting thereon.

Figure 1:
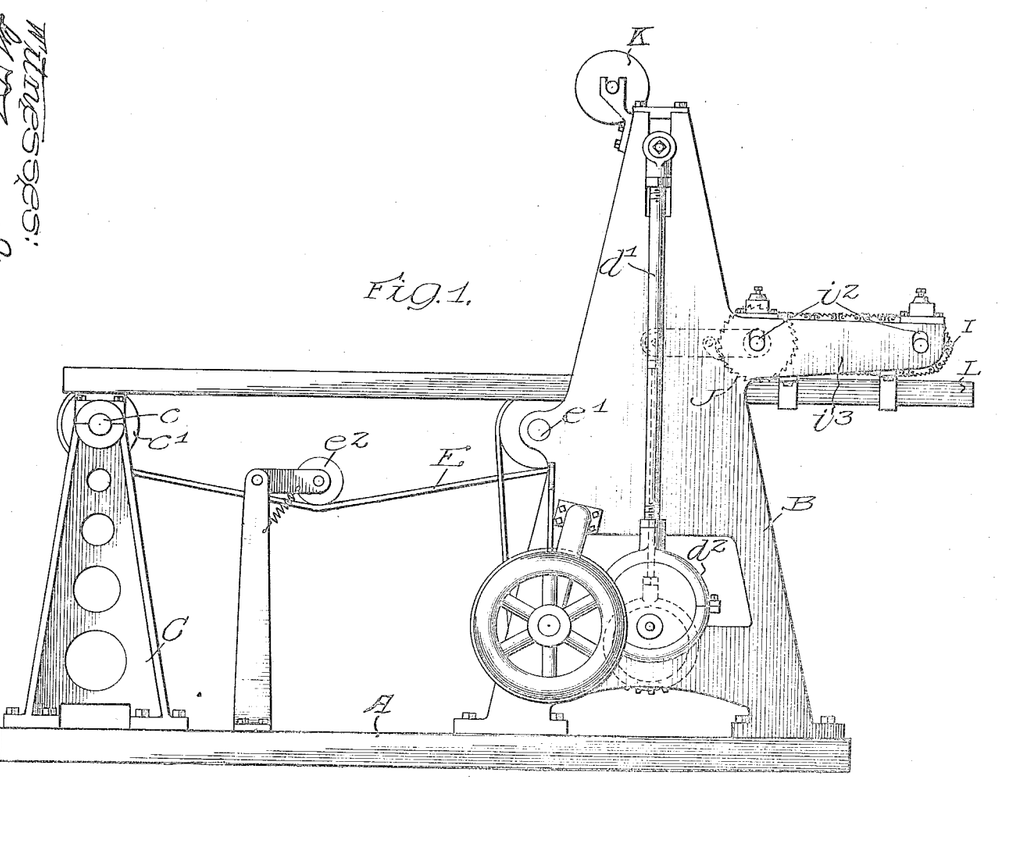
Figure 1 is a side elevation of a box blank machine embodying the principles of my invention.
Figure 2:
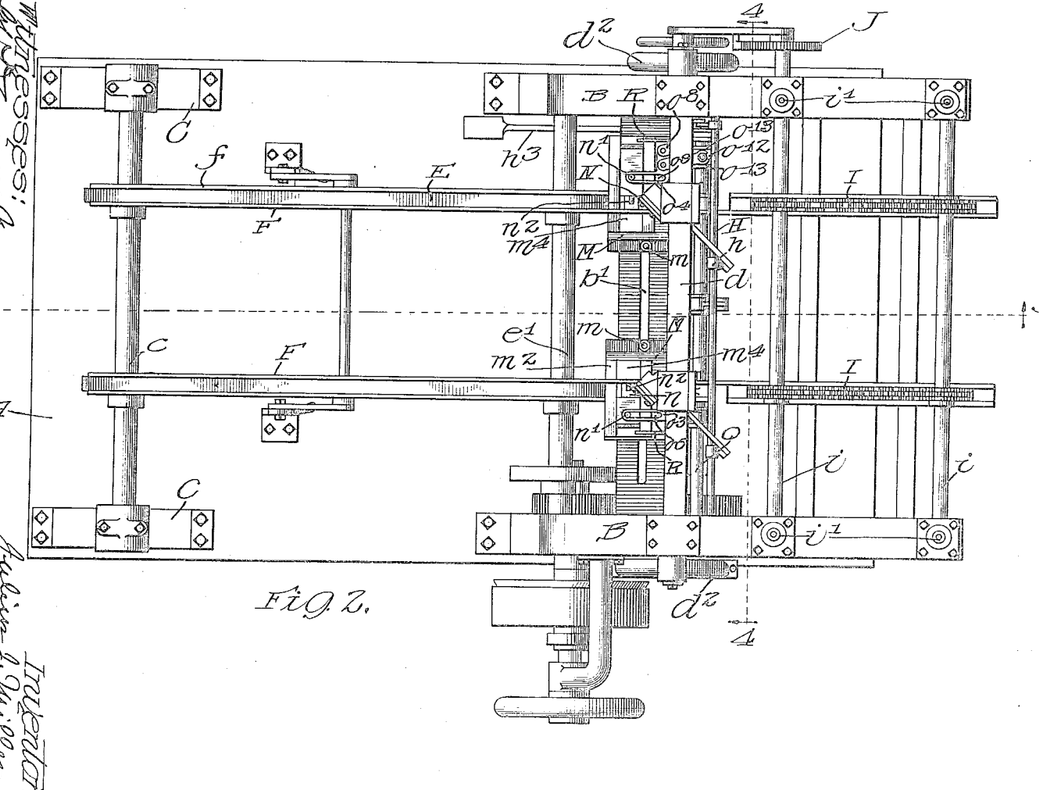
Fig. 2 is a plan of the said machine.
Figure 3:
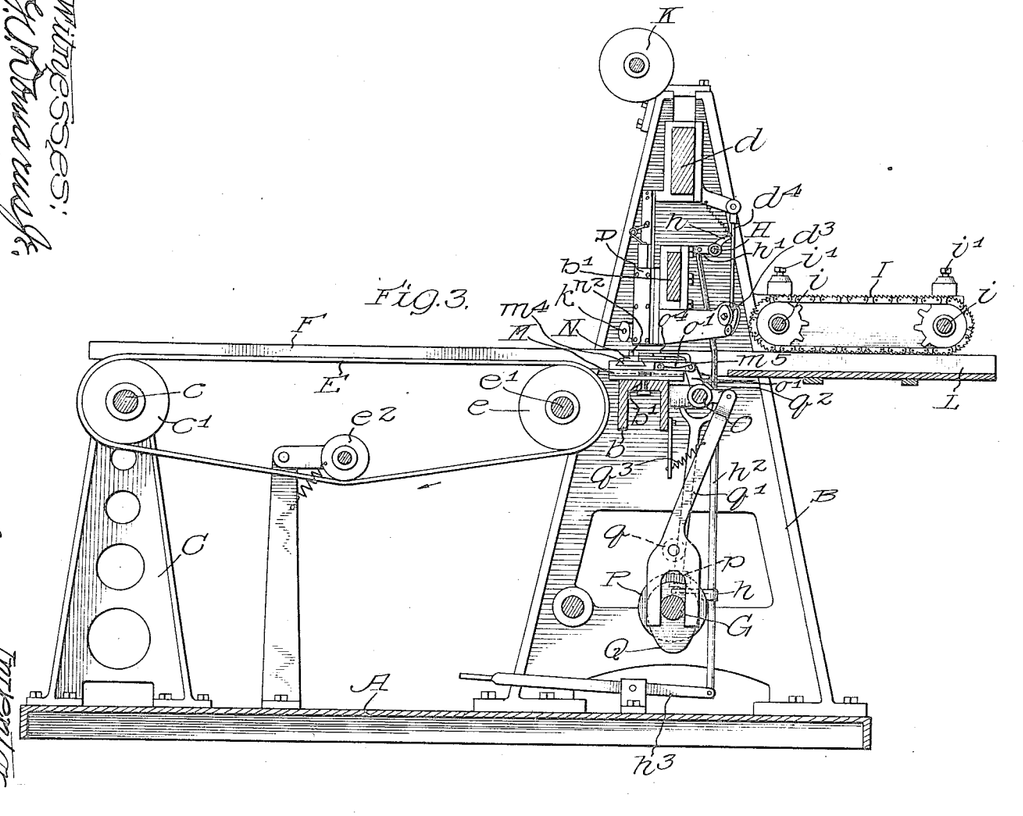
Fig. 3 is a longitudinal section of said machine on line 3—3 in Fig. 2.
Figure 4:
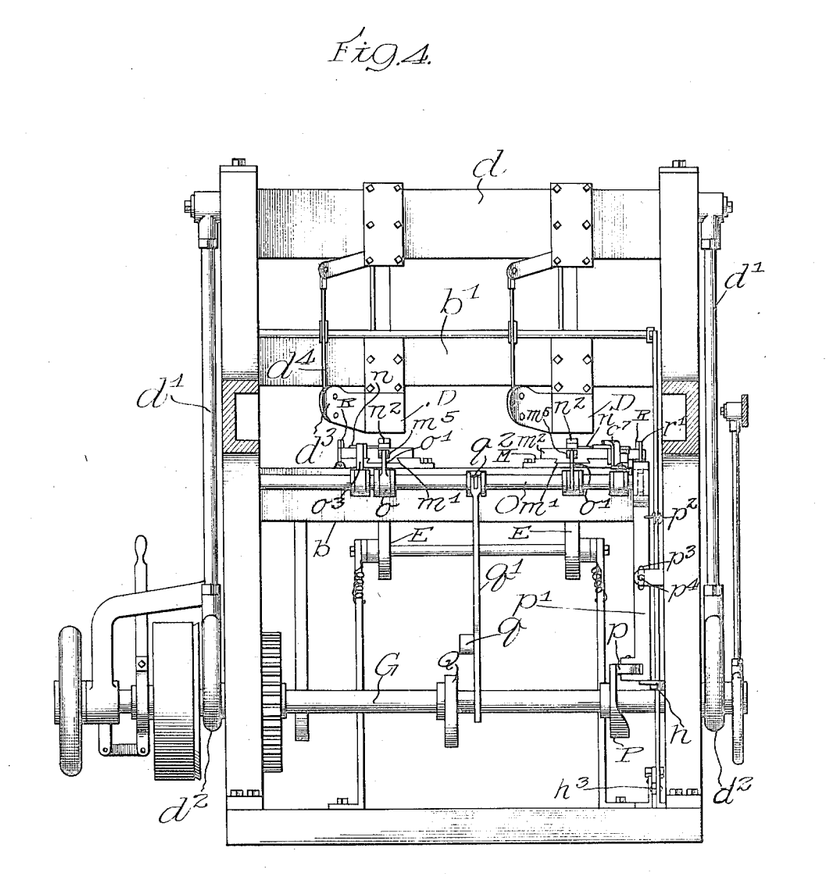
Fig. 4 is a transverse section of the said machine on line 4—4 in Fig 2.
Figure 5:
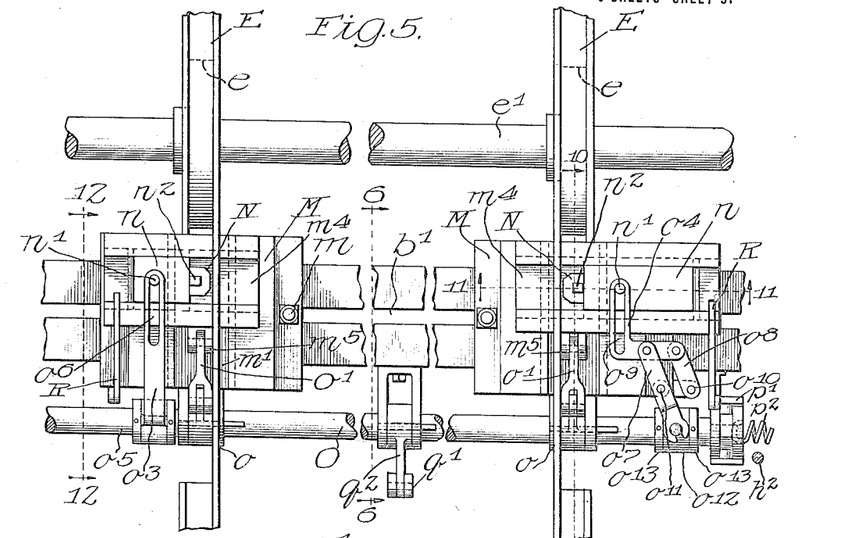
Fig. 5 is an enlarged detail plan view of the spacing mechanism.
Figures 6, 7, 8, 9:
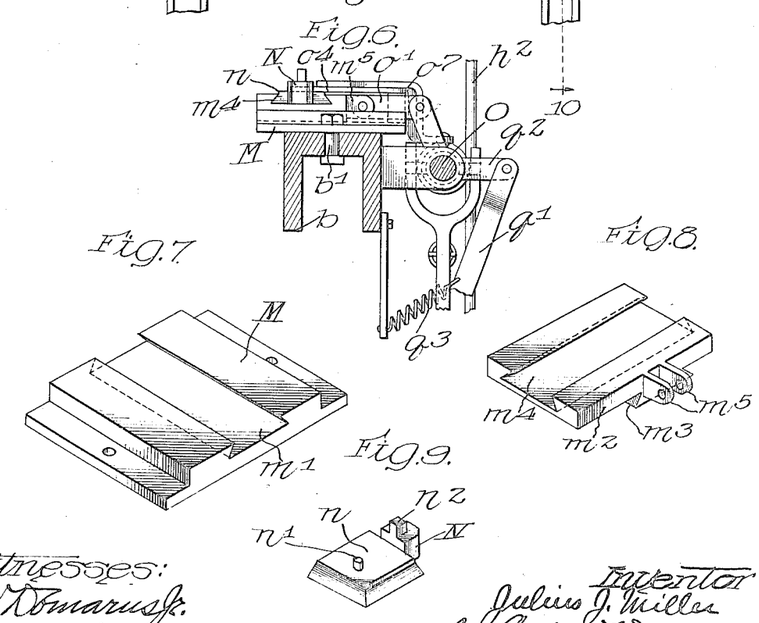
Fig. 6 is a detail section on line 6—6 in Fig. 5.
Fig. 7 is an enlarged perspective view of one of the base plates or guides for the spacing block mechanism, there being one of these base plates at each side of the machine, each plate being in line with the path of the cleats.
Fig. 8 is a similar view of one of the reciprocating spacing block carriers, which carriers slide in the dove-tail grooves on the said base plates.
Fig. 9 is a similar view of one of the spacing blocks of said mechanism, there being one of these blocks at each side of the machine, each block adapted to slide in the dove-tail groove of the reciprocating carrier upon which it is supported.
Figure 10:
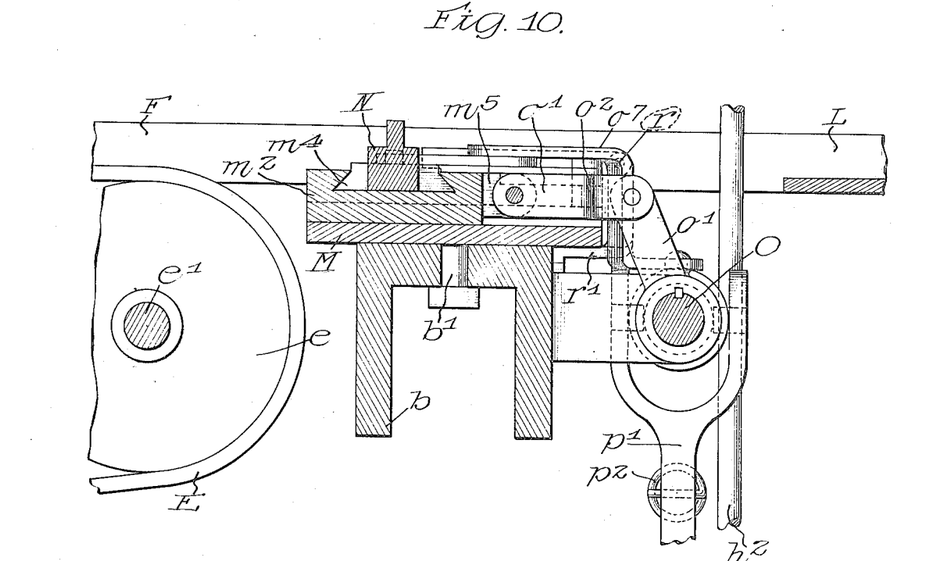
Fig. 10 is an enlarged section on line 10—10 in Fig. 5.
Figure 11:
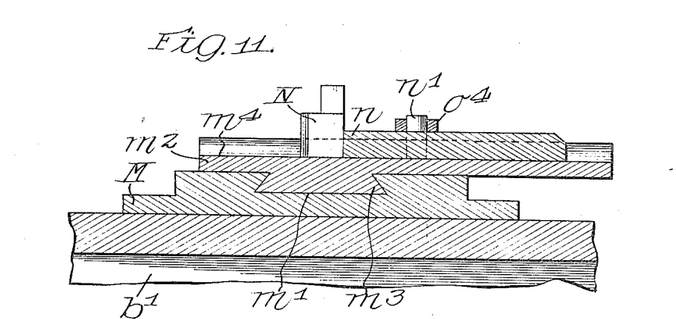
Fig. 11 is an enlarged section on line 11—11 in Fig. 5.
Figure 12:
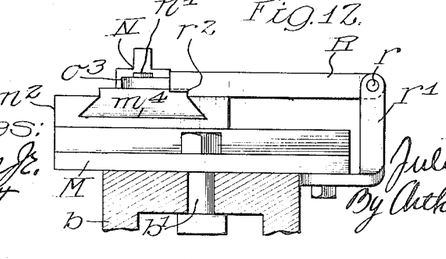
Fig. 12 is an enlarged section on line 12—12 in Fig. 5.

The mechanism for spacing the cleats apart endwise, and for keeping the cleats at one edge of the blank in line with or directly opposite the cleats at the other edge thereof, is arranged directly beneath the stapler heads, being mounted upon the hollow cross bar $b$, and the construction and operation of this spacing mechanism are as follows:

Two base plates M are mounted upon the hollow bar $b$, one at each side of the machine, and adjustably secured thereto by bolts $m$, whereby the distance between said plates may be varied for blanks of different widths when it is desired to change the size of the blank. Each base plate is arranged directly in the path of the oncoming cleats, and is provided with a dove-tail groove $m'$ extending longitudinally of the path of the cleats. Upon each base plate there is mounted a spacing block carrier $m^2$, said carriers having dove-tail portions $m^3$ that slide freely in the dove-tail grooves $m'$ of the said plates. Thus each carrier $m^2$ is adapted to reciprocate longitudinally of the machine, and the arrangement is such that the cleats feed across the upper surface of the carrier $m^2$, as they pass from the long guides F at the front of the machine to the short guides L at the rear of the machine. There are only two spacing blocks for the entire machine, each spacing block being of the character shown in Fig. 9, consisting of the block proper N, provided on its outer side with an integral shank $n$ having a pin or stud $n'$ on the flat top thereof. The shanks $n$ of the blocks are adapted to fit and slide in the dove-tail grooves $m^4$ of the spacing block carriers $m^2$, which grooves extend at right angles to the paths of travel of the cleats, whereby each spacing block is adapted to reciprocate crosswise of the cleats. In addition, of course, each spacing block, by reason of the method of sliding or mounting the carrier $m^2$, is adapted to reciprocate longitudinally of the cleats, but outside of the path of travel of the latter, when they return to normal position—that is to say, each block moves into position between two cleats, travels with the cleats until they are wired together, then moves laterally to a position outside of the path of travel of the cleats, and then moves backward outside of the cleats until it reaches its normal position or starting point. For this purpose, each spacing block may be tapered or beveled at its inner side or end, whereby it is made capable of wedging itself between the ends of two closely adjacent cleats. Each block is also provided at its top with a spacing portion $n^2$ for spacing apart the edges of the veneer—that is to say, the adjacent edges of successive sections of the blank, whereby the box or crate will have lapped edge portions at the corners thereof when completed. The mechanism for causing the two spacing blocks to have this mode of operation consists, as shown, of a rock shaft O mounted in suitable bearings $o$, which bearings may be supported on the cross bar $b$, or on the plates M, in any suitable or desired manner. This rock shaft is provided with arms $o'$ connected by links $o^2$ with the ears $m^5$ on the spacing block carrier $m^2$, whereby the latter are reciprocated back and forth by the rocking of said shaft. This shaft is also movable endwise, and for this purpose has a spline or feather connection with the arms $o'$ of any suitable or desired character. The endwise motion of this shaft O is for the purpose of reciprocating the spacing blocks transversely of the paths of travel of the cleats. This is done by connecting the shaft O with the said spacing blocks by means of arms $o^3$ and $o^4$, the arm $o^3$ being hinged to a collar $o^5$ on the said shaft, whereby said arm may swing up and down. The said arm has a slot $o^6$ in which the pin or stud $n'$ works back and forth when the spacing block moves with the cleats and then returns to starting point. The arm $o^4$ preferably has a bell crank shape, and is connected with the parallel links $o^7$ and $o^8$, whereby its slot $o^9$ always remains parallel with the slot $o^6$, which slot $o^9$ engages the pin or stud $n'$ of the spacing block at this side of the machine. The link $o^8$ is pivoted on a pin or stud $o^{10}$ suitably mounted on any stationary portion of the machine. The link $o^7$ is similarly mounted to swing about a pin or stud $o^{11}$ mounted on any stationary portion of the machine. The link $o^7$ is provided, however, with an end portion which is suitably connected with a loose collar $o^{12}$ on the shaft O, which collar is held between the two fixed collars $o^{13}$, these two collars being necessary to cause the loose collar $o^{12}$ to move with the shaft O when the latter moves endwise. The collar $o^{12}$ does not, however, rotate or rock with the shaft O, whereby its axis of connection with the link $o^7$ remains vertical. With this arrangement, it will be seen that a movement of the shaft O to the right, as shown in Fig. 5, causes the two spacing blocks N to move toward each other, thus causing each block to move into position between the opposing ends of two cleats. Then when the shaft is rocked in the required direction, the links $o'$ pull the carriers $m^2$ toward the delivery end of the machine, thus causing the two spacing blocks to move along with the blank. This endwise reciprocation of the shaft O is produced by a cam P on the shaft G, which cam engages a roll $p$ on the lower end of a vertically disposed lever $p'$ mounted immediately inside of one of the side frames. This lever has its upper end suitably connected with the rock shaft O, and is always subject to the pull of the spring $p^2$, which spring thus applies the power by which the spacing blocks N are moved into position between the ends of the cleats, said spring being suitably connected at its other end with the side frame of the machine. The said lever $p'$ has its middle portion provided with a longitudinal slot $p^3$ that is engaged by the pivot or fulcrum pin $p^4$ supported on the frame of the machine, whereby said lever is capable of moving up and down. The rocking of the shaft O, to pull the spacing blocks back to normal position, is produced by a cam Q on the shaft G, which cam engages a roll $q$ on a pitman $q'$, which pitman has its upper end suitably connected with a crank arm $q^2$ on the said shaft O, whereby upward movement of the pitman $q'$ causes the shaft O to rock, and thereby restore the spacing blocks to normal position—that is to say, to their resting or waiting positions just outside of the paths of travel of the cleats. In such position the blocks bear against the outer sides of the cleats, being caused to do this by the tension of the spring $p^2$, in the manner described. The pitman $q'$ is subject at all times to the pull of the spring $q^3$, whereby this spring serves as a means for rocking the shaft O in the other direction—that is to say, in the direction necessary for making the two spacing blocks move or follow along with the cleats. The cam Q is so shaped that it disengages the roll $q$ as soon as the blocks have been restored to their normal or resting positions, and in this way the said blocks are free to move forward with the cleats as soon as they enter the next two spaces between the ends of the cleats. As soon as the said spacing blocks M reach the limit of their travel in the direction of advancement of the cleats, the cam P then operates the lever $p'$ to reciprocate the shaft O, and thereby quickly withdraw the spacing blocks from between the cleats, the two adjacent cleats at the sides of the blank having by this time been connected together by the driving of at least one staple across the wire and into the cleats which have been moving along immediately in rear of the spacing blocks. Thus the two cams P and Q must be so timed in their operations that the cam P operates first to extract the two spacing blocks from between the cleats which have been wired together, and then immediately, and while the cam P is holding the shaft O in its endwise shifted position, so that the roll $q$ is brought over the cam Q, the said cam Q operates to retract the spacing blocks to their normal or waiting positions where they rub against the smooth outer surfaces of the advancing cleats until they are again projected between the ends of the cleats, by the spring $p^2$, and are then caused by the spring $q^3$ to travel with the said cleats until they are wired together. Thus it will be seen that normally the roll $q$ is out of reach of the cam Q, and is only operated thereby when the shaft O is shifted endwise by the cam P to withdraw the spacing blocks from between the cleats, the formation of the cam P being such that it will continue to hold the shaft O in this shifted position long enough to enable the cam Q to return the blocks to starting point. It will be seen, also, that the said blocks N pull out from between the cleats while the blank is stationary, thus making it possible to withdraw the said blocks in directions at right angles to the cleats. The blocks N can only, therefore, move in between the cleats when the low part of the cam P is in engagement with the roll $p$, and this always occurs while the blank is moving ahead—that is to say, the blocks move into position between the cleats during one of the forward steps of the feeding movement. Thus, only two spacing blocks are necessary for the entire machine, these spacing blocks doing the work of both spacing the cleats apart endwise, and separating the edges of the veneer, whereby separate spacing devices for the cleats and veneer are not necessary—that is to say, the cleats and veneer are spaced by practically one and the same device.

The mechanism for producing a wide space between the ends of the blanks is as follows: As previously explained, the operation of the foot treadle $h^3$ raises the rod $h^2$ and thereby discontinues the feeding of the wire for the staples. This rod is provided also with means for raising the lever $p'$, said means consisting, for example, of a finger $h^4$ which engages the lower end of said lever. When this lever is raised, the roll $p$ is disengaged from and thrown out of reach of the cam P, whereby the spacing blocks are not withdrawn from between the cleats when they reach the limit of their travel in the direction of the forward movement of the blank. To the contrary, the said blocks N, under such circumstances, simply move along with the advancing cleats, and then continue to remain in the path of the cleats after they have been brought to a standstill at the limit of their motion in this direction, whereby the completed blank ahead of the blocks will be moved forward by the action of the feed chains I, but the cleats in rear of the spacing blocks will remain stationary for a period of time, or until the operator removes his foot from the treadle $h^3$, thus producing spaces of any desired width between the ends of the blanks. It will be seen that the blocks N, at such time, remain stationary in the path of the cleats, because of the fact that when the operator presses the foot treadle $h^3$, the roll $p$ is moved out of reach of the cam P, and as this prevents the shaft O from being shifted endwise, it follows that the cam Q will not engage the roll $q$. In other words, both cams will continue to revolve idly, and the spacing blocks will remain in the path of the cleats until the operator removes his foot from the foot treadle, as this will permit the two cams to then withdraw the blocks and return them to starting point. As soon as the operator removes his foot from the treadle $h^3$, the cam P then engages the roll $p$ to pull the spacing blocks away from each other and out of the paths of travel of the cleats, and they are then returned as before to their original or normal positions.

With the construction and mode of operation described, it will be seen that some means are necessary for locking and holding the spacing blocks N in normal or waiting position, after the cam Q has disengaged itself from the roll $q$, as otherwise the spring $q^3$ would then immediately pull the blocks forward to a position opposite the limit of their extent of travel with the cleats. For this purpose, therefore, locking means, in the form of latches R are provided, one for each side of the machine, these latches being pivoted at $r$ to the upper ends of brackets $r'$ on the bottoms of the plates M, or on any other stationary portion of the machine. These latches R reach over and rest with their free ends on the tops of the carriers $m^2$, and are provided with notches $r^2$ that engage the slightly elevated corners or transverse edges of the shank $n$, when the said carriers are brought back to normal position, thus locking the said carriers against forward movement when the said disengagement of the cam Q takes place. When the ends of the cleats come opposite the spacing blocks M, the spring $p^2$ then reciprocates the shaft O, in the manner already described, to cause the blocks to enter between the ends of the cleats, and this also serves to disengage the shanks $n$ from the ends of the latches R, this unlocking action taking place in the proper manner as the two blocks enter between the ends of the cleats. Thus unlocked, the spacing block carriers are free to move ahead with the cleats, under the propelling power of the spring $q^3$; but, of course, the said spacing blocks and their carriers cannot move any faster than the work is being moved along by the step by step actuated feed chains I, in a manner that will be readily understood.

To change the width of the blanks, it is only necessary to adjust the stapler heads D relative to each other, in the usual and well known manner, and to change the space between the guides for the cleats, these guides E and L being suitably mounted for this purpose. The slot $b'$ in the cross bar $b$ permits the plates M to be moved toward or away from each other, and the splines or feathers on the shafts O permit the connections therewith to be adjusted longitudinally thereof, whereby the distance between the two spacing blocks may be varied at will, to keep the said blocks in proper working relation to the guides for the cleats. Also, and for the purpose of thus varying the widths of the blanks, the pulleys $c'$ and $e$ are adjustable upon the shafts $c$ and $d'$ in any suitable or desired manner.

No adjustment whatever is necessary when the length of the cleats is changed. The operation of the machine is practically the same, and no adjustment is necessary, for either short or long cleats. Thus the length of the blanks can be changed instantly without any adjustment of the machine, and whether the cleats are long or short the operation of the machine is practically the same. The only adjustment that is necessary is when the width of the blank is changed, and then the operative parts of the machine are brought nearer together or spaced farther apart, as the case may be, in the manner explained.

As shown, the spacing blocks N are adapted to be used in connection with cleats having step mitered ends, of the usual and well known character. The operator or attendant stands at the forward end of the machine, and the cleats are placed in guides and allowed to move forward on the belts E, whereby the ends of the cleats are crowded together at this stage of the operation. However, with the cleats step mitered at their ends, gaps or openings will occur where the ends of the cleats engage each other, and into these gaps or openings the spacing blocks N will push or crowd their way, as previously explained, whereby the cleats are successively spaced apart. As the spacing blocks start to advance or move along with the cleats, the operator or attendant places the sheet of veneer upon the cleats, and pushes the edge of said sheet of veneer up against the spacing portions $n^2$, keeping hold of the said sheet until the same is wired and stapled to the cleats.

The shaft O extends transversely below the cleats and serves, it will be seen, as a movable member for connecting together the reciprocating supports upon which the spacing blocks are carried, and for thereby keeping the two spacing blocks exactly opposite each other. In this way, the spaces at one side of the blank are always opposite the spaces at the other side, as the two spacing blocks are compelled to move in unison.

What I claim as my invention is:

1. In a box blank machine, means for securing the cleats together successively, means for moving the cleats for operation of said means thereon, means for causing the materials to move intermittently during the securing operation, mechanism for properly spacing the cleats apart endwise before being secured together, said mechanism comprising a spacing block, means for automatically inserting said block between the ends of the cleats, means to cause said block to move a distance with the cleats, means for withdrawing the block from between the cleats, arranged to operate while the materials are standing still, and means for returning the block to normal position, the said insertion and withdrawal being at right angles to the cleats, to keep the block square while moving in or out between the cleats.

2. In a box blank machine, means for securing the cleats together successively, means for moving the cleats for operation of said means thereon, means for causing the materials to move intermittently during the securing operation, mechanism for properly spacing the cleats apart endwise before being secured together, said mechanism comprising a spacing block, and means for withdrawing the said block in a straight line at right angles to the cleats arranged to operate while the materials are standing still.

3. In a box blank machine, means for securing the cleats together successively, means for moving the cleats for operation of said means thereon, means for causing the materials to move intermittently during the securing operation, mechanism for properly spacing the cleats apart endwise before being secured together, said mechanism comprising a spacing block, a carrier on which said block slides in and out between the cleats, at right angles thereto, means for causing said in and out motion of the block while said carrier is standing still, and a support on which the said carrier reciprocates in the direction of the cleats.

4. In a box blank machine, means for securing the cleats together successively, means for moving the cleats for operation of said means thereon, means for causing the materials to move intermittently during the securing operation, mechanism for properly spacing the cleats apart endwise before being secured together, said mechanism comprising a spacing block movable in and out between the end of the cleats, and means for withdrawing the block laterally from between the cleats, timed to operate only while the cleats are standing still.

5. In a box blank machine, means for securing the cleats together successively, means for moving the cleats for operation of said means thereon, means for causing the materials to move intermittently during the securing operation, mechanism for properly spacing the cleats apart endwise before being secured together, said mechanism comprising a spacing block movable in and out between the ends of the cleats, and means including a rotary cam for withdrawing the block laterally of the cleats, timed to operate while the materials are standing still.

6. In a box blank machine, means for securing the cleats together successively, means for moving the cleats for operation of said means thereon, mechanism for properly spacing the cleats apart endwise before being secured together, said mechanism comprising a spacing block movable in and out between the cleats, constructed and arranged to travel a distance with the cleats, means including a rotary cam for moving said block back to starting position, and a device for holding the block in said position until it moves in between the cleats.

7. In a box blank machine, means for securing the cleats together successively, means for moving the cleats for operation of said means thereon, mechanism for properly spacing the cleats apart endwise before being secured together, said mechanism comprising a single spacing block for each parallel row of cleats, a rock shaft connected for moving the blocks in the direction of the cleats, and means for reciprocating said shaft endwise to move the blocks crosswise of the cleats.

8. In a box blank machine, means for securing the cleats together successively, means for moving the cleats for operation of said means thereon, mechanism for properly spacing the cleats apart endwise before being secured together, said mechanism comprising a spacing block movable in and out between the cleats, means including a spring for inserting the block into the path of the cleats, means including a spring for causing the block to travel a distance with the cleats, means including a rotary cam for withdrawing the block from the path of the cleats, and means including a rotary cam for returning the block to starting position.

9. In a box blank machine, means for securing the cleats together successively, means for moving the cleats for operation of said means thereon, means for causing the materials to move intermittently during the wiring operation, mechanism for properly spacing the cleats apart endwise before being secured together, said mechanism comprising a spacing block, means for automatically inserting said block between the ends of the cleats, means to cause said block to move a distance with the cleats, means for withdrawing the block from between the cleats, while the materials are standing still, and means for returning the block to normal position, the said insertion and withdrawal being at right angles to the cleats, to keep the block square while moving in or out between the cleats, said mechanism comprising guides disposed at right angles to each other to determine the movements of said block, one guide holding the other to movement in a straight line with the cleats, and said other guide holding the block to movement in a straight line transversely of the cleats.

10. In a box blank machine, means for securing the cleats together successively, means for moving the cleats for operation of said means thereon, means for causing the materials to move intermittently during the wiring operation, mechanism for properly spacing the cleats apart endwise before being secured together, said mechanism comprising a spacing block, and means for withdrawing the said block in a straight line at right angles to the cleats; while the materials are standing still, said mechanism comprising guides disposed at right angles to each other to determine the movements of said block, one guide holding the other to movement in a straight line with the cleats, and said other guide holding the block to movement in a straight line transversely of the cleats.

11. In a box blank machine, means for securing the cleats together successively, means for moving the cleats for operation of said means thereon, means for causing the materials to move intermittently during the securing operation, mechanism for properly spacing the cleats apart endwise before being wired together, said mechanism comprising a spacing block, a carrier on which said block slides in and out between the cleats, at right angles thereto, while said carrier is standing still, and a support on which the said carrier reciprocates in the direction of the cleats, said mechanism comprising guides disposed at right angles to each other to determine the movements of said block, one guide holding the other to movement in a straight line with the cleats, and said other guide holding the block to movement in a straight line transversely of the cleats.

12. In a box blank machine, means for securing the cleats together successively, means for moving the cleats for operation of said means thereon, means for causing the materials to move intermittently during the securing operation, mechanism for properly spacing the cleats apart endwise before being secured together, said mechanism comprising a spacing block movable in and out between the ends of the cleats, and means for withdrawing the block laterally while the cleats are standing still, said mechanism comprising guides disposed at right angles to each other to determine the movements of said block, one guide holding the other to movement in a straight line with the cleats, and said other guide holding the block to movement in a straight line transversely of the cleats.

13. In a box blank machine, means for securing the cleats together successively, means for moving the cleats for operation of said means thereon, means for causing the materials to move intermittently during the securing operation, mechanism for properly spacing the cleats apart endwise before being secured together, said mechanism comprising a spacing block movable in and out between the ends of the cleats, and means including a rotary cam for withdrawing the block laterally of the cleats, timed to operate while the materials are standing still.

14. In a box blank machine, means for securing the cleats together successively, means for moving the cleats for operation of said means thereon, mechanism for properly spacing the cleats apart endwise before being secured together, said mechanism comprising a spacing block movable in and out between the cleats, constructed and arranged to travel a distance with the cleats, means including a rotary cam for moving said block back to starting position, while the cleats are standing still and a device for holding the block in said position until it moves in between the cleats, said mechanism comprising guides disposed at right angles to each other to determine the movements of said block.

15. In a box blank machine, means for securing the cleats together successively, means for moving the cleats for operation of said means thereon, mechanism for properly spacing the cleats apart endwise before being secured together, said mechanism comprising a single spacing block for each parallel row of cleats, a rock shaft operating to move the blocks in the direction of travel of the cleats, and means for reciprocating said shaft endwise to move the blocks crosswise of the path of travel of the cleats, said mechanism comprising guides disposed at right angles to each other to determine the movements of said block.

16. In a box blank machine, means for securing the cleats together successively, means for moving the cleats for operation of said means thereon, mechanism for properly spacing the cleats apart endwise before being secured together, said mechanism comprising a spacing block movable in and out between the cleats, means including a spring for inserting the block into the path of the cleats, means including a spring for causing the block to travel a distance with the cleats, means including a rotary cam for withdrawing the block from the path of the cleats, and means including a rotary cam for returning the block to starting position, said mechanism comprising guides disposed at right angles to each other to determine the movements of said block.

17. In a box blank machine, means for feeding the cleats in unspaced relation, means for successively wiring the cleats together, means for causing the materials to move intermittently during the securing operation, mechanism for properly spacing the cleats apart endwise before being secured together, said mechanism comprising a spacing block, means for automatically inserting said block between the ends of the cleats, means to cause said block to move a distance with the cleats, means for withdrawing the block from between the cleats, constructed and arranged to operate while the materials are standing still, and means for returning the block to normal position, the said insertion and withdrawal being at right angles to the cleats, to keep the block square while moving in or out between the cleats, said mechanism comprising a sliding shank for said block.

18. In a box blank machine, means for feeding the cleats in unspaced relation, means for successively wiring the cleats together, means for causing the materials to move intermittently during the securing operation, mechanism for properly spacing the cleats apart endwise before being secured together, said mechanism comprising a spacing block, and means for withdrawing the said block in a straight line at right angles to the cleats, constructed and arranged to operate while the materials are standing still, said mechanism comprising a sliding shank for said block.

19. In a box blank machine, means for feeding the cleats in unspaced relation, means for successively wiring the cleats together, means for causing the materials to move intermittently during the securing operation, mechanism for properly spacing the cleats apart endwise before being secured together, said mechanism comprising a spacing block, a carrier on which said block slides in and out between the cleats, at right angles thereto, means for withdrawing the block while said carrier is standing still, and a support on which the said carrier reciprocates in the direction of the cleats, said mechanism comprising a sliding shank for said block.

20. In a box blank machine, means for feeding the cleats in unspaced relation, means for successively wiring the cleats together, means for causing the materials to move intermittently during the securing operation, mechanism for properly spacing the cleats apart endwise before being secured together, said mechanism comprising a spacing block movable in and out between the ends of the cleats, and means for withdrawing the block laterally while the cleats are standing still, said mechanism comprising a sliding shank for said block, connected with said withdrawing means.

21. In a box blank machine, means for feeding the cleats in unspaced relation, means for successively wiring the cleats together, means for causing the materials to move intermittently during the securing operation, mechanism for properly spacing the cleats apart endwise before being secured together, said mechanism comprising a spacing block movable in and out between the ends of the cleats, and means including a rotary cam for withdrawing the block laterally of the cleats, timed to operate while the materials are standing still, said mechanism comprising a sliding shank for said block, operatively connected with said cam.

22. In a box blank machine, means for feeding the cleats in unspaced relation, means for successively wiring the cleats together, mechanism for properly spacing the cleats apart endwise before being secured together, said mechanism comprising a spacing block movable in and out between the cleats, constructed and arranged to travel a distance with the cleats, means including a rotary cam for moving said block back to starting position, and a device for holding the block in said position until it moves in between the cleats, said mechanism comprising a sliding shank for said block.

23. In a box blank machine, means for feeding the cleats in unspaced relation, means for successively wiring the cleats together, mechanism for properly spacing the cleats apart endwise before being secured together, said mechanism comprising a single spacing block for each parallel row of cleats, a rock shaft connected for moving the blocks in the direction of travel of the cleats, and means for reciprocating said shaft endwise to move the blocks crosswise of the path of travel of the cleats, said mechanism comprising a sliding shank for said block.

24. In a box blank machine, means for feeding the cleats in unspaced relation, means for successively wiring the cleats together, mechanism for properly spacing the cleats apart endwise before being secured together, said mechanism comprising a spacing block movable in and out between the cleats, means including a spring for inserting the block into the path of the cleats, means including a spring for causing the block to travel a distance with the cleats, means including a rotary cam for withdrawing the block from the path of the cleats, and means including a rotary cam for returning the block to starting position, said mechanism comprising a sliding shank for said block.

25. In a box blank machine, means for feeding the cleats in unspaced relation, means for successively wiring the cleats together, mechanism for properly spacing the cleats apart endwise before being secured together, including a spacing block, and means for stopping the securing operation and retarding the action of said spacing mechanism to produce a relatively wide space between blanks, said mechanism comprising a sliding shank for said block, and means connected with said shank for operating the block.

26. A box blank machine comprising means for feeding the cleats in parallel rows, an automatic spacing block for each row, movable a distance with the cleats, means for securing the sections of the blank together, a reciprocating support for each block, and a connection between the supports, extending across the machine below the cleats, serving to keep the two blocks exactly opposite each other.

27. A box blank machine comprising means for feeding the cleats in parallel rows, an automatic spacing block for each row, movable a distance with the cleats, means for securing the sections of the blank together, a reciprocating support for each block, a connection between the supports, extending across the machine below the cleats, serving to keep the two blocks exactly opposite each other, means for spacing apart the sections along the edges thereof, and means for causing wider spaces between blanks.

28. A box blank machine comprising means for feeding the cleats in parallel rows, an automatic spacing block for each row, movable a distance with the cleats, means for securing the sections of the blank together, a reciprocating support for each block, a connection between the supports, extending across the machine below the cleats, serving to keep the two blocks exactly opposite each other, a shaft, and means operated by said shaft for returning the blocks to position of rest at one side of the cleats.

29. A box blank machine comprising means for feeding the cleats in parallel rows, an automatic spacing block for each row, movable a distance with the cleats, means for wiring the sections of the blank together, a reciprocating support for each block, a connection between the supports, extending across the machine below the cleats, serving to keep the two blocks exactly opposite each other, means for mounting the supports in alinement transversely of the machine, and means for causing the blocks to move in and out of the path of the cleats.

30. A box blank machine comprising an automatically operated spacing block whereby the cleats are spaced apart at the ends thereof, means for feeding the cleats, and means operating to withdraw the block from spacing position while the cleats are standing still.

31. A box blank machine having automatically operated reciprocating spacing blocks, and power operated means for retracting said blocks to normal position.

32. A box blank machine having automatically operated reciprocating spacing blocks, and power operated means for withdrawing said blocks from spacing position.

33. A box blank machine comprising, in combination, means for securing together the blank forming materials, means to guide the cleats for operation of said securing means thereon, and a spacer automatically insertible between successive cleats and arranged for movement therewith to a point past said securing means, the machine being so constructed and arranged that the movement of the secured together materials is halted and the spacer simultaneously withdrawn.

34. A box blank machine comprising, in combination, means for securing together the blank forming materials, means to guide the cleats for operation of said securing means thereon, and a spacer automatically insertible between successive cleats and arranged for movement therewith to a point past said securing means, the machine being so constructed and arranged that the movement of the secured together materials is halted and the spacer simultaneously withdrawn and returned for reinsertion between cleats.

35. A box blank machine comprising, in combination, means for securing together the blank forming materials, means for moving the cleats for operation of said securing means thereon, and a spacer automatically insertible between successive cleats and arranged for movement therewith to a point past said securing means, the machine being so constructed and arranged that the movement of the secured together materials is halted and the spacer simultaneously withdrawn.

36. A box blank machine comprising, in combination, means for securing together the blank forming materials, means for moving the cleats for operation of said securing means thereon, and a spacer automatically insertible between successive cleats and arranged for movement therewith to a point past said securing means, the machine being so constructed and arranged that the movement of the secured together materials is halted and the spacer simultaneously withdrawn and returned for reinsertion between cleats.

37. In a box blank machine, means for securing together the blank-forming materials, means for moving the cleats in rows for operation of said means thereon, a spacing block for each row, means to cause each block to space successive pairs of cleats during their connection by the securing operation, and a single mechanism for operating all the blocks.

38. A box blank machine comprising, in combination, means for securing together the blank-forming materials, means to guide the cleats for operation of said means thereon, a spacer automatically insertible behind a cleat and arranged for movement therewith to a point past said securing means, a mechanism imparting an intermittent feeding movement to the materials operated on by said wiring means, and means acting to withdraw the spacer from engagement with the cleats in the intervals of said feeding movement.

39. A box blank machine comprising, in combination, means for securing together the blank-forming materials, means to guide the cleats for operation of said means thereon, a spacer automatically insertible behind a cleat and arranged for movement therewith to a point past said securing means, a mechanism imparting an intermittent feeding movement to the materials operated on by said wiring means, and means acting to withdraw the spacer from engagement with the cleats in the intervals of said feeding movement and to return it for insertion behind another cleat.

Signed by me at Chicago Illinois this 28th day of Sept. 1911.

JULIUS J. MILLER.

Witnesses:
GEO. F. SCHMIDT,
ELLEN H. CLEGG.